(12) United States Patent
Tyrén

(10) Patent No.: US 6,417,771 B1
(45) Date of Patent: Jul. 9, 2002

(54) SENSOR, A METHOD AND A SYSTEM FOR REMOTE DETECTION OF OBJECTS

(75) Inventor: Carl Tyrén, Parc Saint Roman (MC)

(73) Assignee: RSO Corporation N.V., Curacao (AN)

( * ) Notice: Subject to any disclaimer, the term of this patent is extended or adjusted under 35 U.S.C. 154(b) by 0 days.

(21) Appl. No.: 09/719,480

(22) PCT Filed: Jun. 18, 1999

(86) PCT No.: PCT/SE99/01102

§ 371 (c)(1),
(2), (4) Date: Mar. 17, 2001

(87) PCT Pub. No.: WO99/66466

PCT Pub. Date: Dec. 23, 1999

(30) Foreign Application Priority Data

Jun. 18, 1998 (SE) ................................................ 9802221

(51) Int. Cl.⁷ ................................................ G08B 13/14
(52) U.S. Cl. ............................... 340/572.2; 340/572.4; 340/572.6; 340/551
(58) Field of Search ........................... 340/10.33, 10.42, 340/551, 572.1, 572.2, 572.4, 572.6, 505; 342/44, 51, 162

(56) References Cited

U.S. PATENT DOCUMENTS

| | | | | |
|---|---|---|---|---|
| 4,510,489 A | * | 4/1985 | Anderson, III et al. | 340/572.2 |
| 5,406,262 A | * | 4/1995 | Herman et al. | 340/572.1 |
| 5,729,200 A | * | 3/1998 | Copeland et al. | 340/551 |
| 5,729,201 A | | 3/1998 | Jahnes et al. | 340/572.1 |
| 6,066,947 A | * | 5/2000 | Tamura | 324/207.21 |
| 6,225,905 B1 | * | 5/2001 | Tyren et al. | 340/572.6 |

FOREIGN PATENT DOCUMENTS

| | | |
|---|---|---|
| EP | 0 623 237 | 11/1994 |
| GB | 2 322 769 | 9/1998 |
| WO | WO88/01427 | 2/1988 |
| WO | WO93/14474 | 7/1993 |

OTHER PUBLICATIONS

David Jiles, "Introduction to Magnetism and Magnetic Materials", London: Chapman & Hall, Second Edition, ISBN 0 412 79850 6, pp. 89–96, (1998).

* cited by examiner

Primary Examiner—Van T Trieu
(74) Attorney, Agent, or Firm—Finnegan, Henderson, Farabow, Garrett & Dunner, L.L.P.

(57) ABSTRACT

A method for remote detection of objects, each object is provided with a sensor comprising at least two magnetic elements arranged in a predetermined mutual relationship representing an identity of the sensor. Electromagnetic signals are generated for exciting the sensor elements to produce electromagnetic reply signals. An amplitude of the electromagnetic reply signal from each sensor element is modulated by a first magnetic field having a magnitude-variant and a magnitude-invariant component. A second magnetic field is generated with rotating field vector. A frequency shift is detected in a component of the reply signal, when a magnitude-invariant component of the second magnetic field balances the magnitude-invariant component of the first magnetic field, wherein the respective sensor element is momentarily exposed to a resulting magnetic field with essentially no magnitude-invariant component. An orientation of the respective sensor element is determined from the orientation of the magnitude-invariant component of the second magnetic field, when the frequency shift occurs.

16 Claims, 4 Drawing Sheets

SENSOR, A METHOD AND A SYSTEM FOR REMOTE DETECTION OF OBJECTS

The presence application is the national stage under 35 U.S.C. 371 of PCT/SE99/01 102, filed on Jun. 18, 1999.

TECHNICAL FIELD

The present invention relates to a method and a system for remote detection of objects, each object being provided with a sensor comprising at least two magnetic elements arranged in a predetermined mutual relationship representing an identity of the sensor, wherein electromagnetic signals are generated for exciting the sensor elements to produce electromagnetic reply signals and wherein an amplitude of the electromagnetic reply signal from each sensor element is modulated by a magnetic field having a magnitude-variant and a magnitude-invariant component. The invention also relates to a sensor for remote detection of objects, comprising at least two magnetic sensor elements, which are arranged in a mutual relationship selected from a set of predetermined relationship and representing an identity of the sensor, or of an object to which the sensor is attached.

DESCRIPTION OF THE PRIOR ART

Many applications require a reliable and contactless detection of the presence, identity or position of objects within a detection zone. Common examples are for instance price labeling of commercial articles, identification of components in production lines, identification of material type at recycling plants or electronic article surveillance in e.g. shops.

For some applications it is sufficient to detect the presence of the object or article. One example is a simple electronic article surveillance system, which is arranged to provide an alarm signal, once a protected article is carried into a detection zone. Such a simple application uses one single sensor element in the form of a thin metal strip or wire with magnetic properties. The sensor element may be detected magnetically by means of arc-shaped magnetic generators/detectors, which expose the sensor element to a alternating magnetic field, which affects a physical property of the sensor element. Use is often made of the fact that the alternating magnetic field causes a periodical switch of the magnetic momentum of dipole of the sensor element, which is also known as Barkhausen jumps. Sensors of this kind are for instance disclosed in U.S. Pat. No. 5,496,611, EP-A-0 710 923 and EP-A-0 716 393.

A different single-element sensor technology is described in WO97/29463 and WO97/29464, wherein each sensor comprises a wire-shaped element of amorphous or nano-crystalline metal alloy. An important feature of the amorphous or nano-crystalline metal alloy is that the permeability thereof may be controlled by an alternating magnetic modulating field. Through a physical effect known as Giant Magnetoimpedance, the amplitude of an electromagnetic reply signal from the sensor is modulated by the magnetic modulating field, when the sensor is excited by an electromagnetic interrogation signal. The modulation in amplitude in the reply signal is detected and used for determining the presence of the sensor in the detection zone.

None of the electronic article surveillance applications described above provides a remotely detectable identity for each sensor. However, for advanced applications it is necessary to provide such identity information, representing e.g. an article number, serial number, material code etc for the respective object, to which each sensor is attached. Such sensors or markers are disclosed in WO88/01427, wherein each sensor or marker is provided with a number of magnetostrictive strips or ribbons made of an amorphous ferromagnetic material and arranged in predetermined angular relationships or at predetermined distances from each other. The identity of such a sensor is represented by the predetermined relationships as well as the respective type of individual sensor elements. The sensor elements are excitable to mechanical resonance by magnetic energy. The magnetic signals generated by the resonating sensor elements may be detected magnetically or inductively.

A similar system is described in WO93/14478, wherein the sensors or markers are provided with one or more than one electrical resonant circuits, each of which is inductively coupled to a respective magnetic sensor element. Each electrical resonant circuit is excited to oscillate electrically, and the resonant frequency thereof is controllable, through the permeability of the magnetic element, by an external magnetic field, wherein a simultaneous detection of several identical sensors is possible.

In summary, prior art sensors for remote detection of objects are either of a single-element type, allowing only the presence of each sensor to be detected, or of a multi-element type, allowing also an identity of each sensor to be detected. Single-element sensors are easier to design and produce and therefore have a lower unit cost. On the other hand, multi-element sensors require a supporting carrier (particularly for mechanically resonating sensor elements) and/or capacitive and inductive components (for the electric resonant circuit versions). Naturally, this implies a higher cost per unit. Additionally, since the multi-element sensors described above mainly operate by a magnetic or inductive link, the operating distance of the detection system is quire narrow.

SUMMARY OF THE INVENTION

An objective of the present invention is to provide a sensor for remote detection of objects, which is capable of representing an identity of the sensor, or of the object to which the sensor is attached, at a substantially lower cost than the prior art sensors. A subsidiary objective of the present invention is to provide a sensor, the operating distance of which is far better than that of the prior art multi-element sensors described above.

The objectives are achieved by a method for remote detection of objects, wherein each object is provided with a sensor comprising at least two magnetic elements arranged in a predetermined mutual relationship representing an identity of the sensor, wherein electromagnetic signals are generated for exciting the sensor elements to produce electromagnetic reply signals and wherein an amplitude of the electromagnetic reply signal from each sensor element is modulated by a first magnetic field having a magnitude-variant and a magnitude-invariant component.

The method further comprises the steps of generating a second magnetic field with rotating field vector; detecting a frequency shift in a component of said reply signal occurring when a magnitude-invariant component of said second magnetic field balances the magnitude-invariant component of said first magnetic field, wherein the respective sensor element is momentarily exposed to a resulting magnetic field with essentially no magnitude-invariant component; and determining an orientation of the respective sensor element from the orientation of the magnitude-invariant component of said second magnetic field, when said frequency shift occurs.

Furthermore, the objectives are achieved by a sensor for remote detection of objects, comprising at least two magnetic sensors elements, which are arranged in a mutual relationship selected from a set of predetermined relationships and representing an identity of the sensor, or of an object to which the sensor is attached, said sensor elements being electromagnetically detectable and comprising a magnetic material, the permeability of which is controllable by a magnetic field and the high-frequency impedance. of which depends on said permeability.

Other objectives, features and advantages of the present invention appear from the following detailed disclosure, from the drawings as well from the appended patent claims.

BRIEF DESCRIPTION OF DRAWINGS

A preferred embodiment of the present invention will now be described with reference to the accompanying drawings, in which.

DETAILED DISCLOSURE OF THE INVENTION

Figure 1:
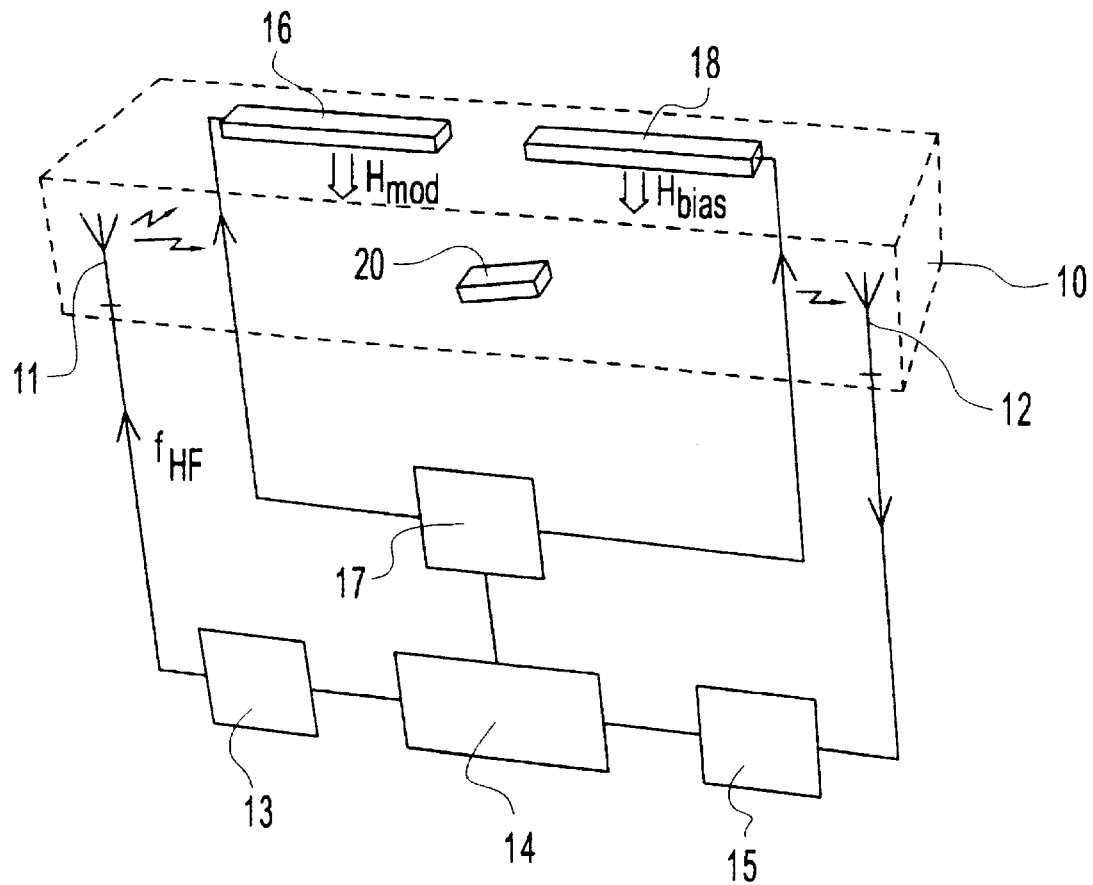
FIG. 1 illustrates a system for remote detection of objects, in which the method and sensor according to the present invention may be applied.

FIG. 1 illustrates an exemplary embodiment of a system for remote detection of objects, in which a sensor according to one embodiment of the present invention is used. A transmitter antenna 11 and a receiver antenna 12 are arranged in a detection zone 10. The transmitter antenna 11 is operatively connected to an output stage 13, which in turn is connected to a controller 14. The output stage comprises various commercially available driving and amplifying circuits and means for generating an alternating electric current of high frequency $f_{HF}$, said current flowing back and forth through the transmitter antenna 11 when supplied thereto, wherein a high-frequency electromagnetic field is generated around the transmitter antenna. This electromagnetic field is used, as will be described in more detail below, for exciting a sensor present in the detection zone 10, so that the sensor will transmit, at the reception of electromagnetic energy from the transmitter antenna 11, an electromagnetic reply signal, which is received by the receiver antenna 12.

The receiver antenna 12 is operatively connected to an input stage 15, which comprises conventional means with amplifying and signal processing functions, such as bandpass filtering and amplifying circuits. The input stage 15 also comprises means for demodulating the electromagnetic reply signal and supplying it to the controller 14.

The transmitter antenna 11 as well as the receiver antenna 12 thus have the purpose of converting, in a known way, between an electrical signal of high frequency and an electromagnetic signal. Preferably, the antennas are helically formed antennas with rotating polarization (for optimal coverage in all directions), or alternatively conventional end-fed or center-fed halfwave whip antennas, but other known antenna types are equally possible.

The detection zone 10 is additionally provided with means 16 for generating a first magnetic field $H_{mod}$. The means 16 is connected to the controller 14 via a driving stage 17. The driving stage 17 comprises means for generating a modulating current, which is supplied to the means 16, wherein a magnetic modulating field $H_{mod}$ is generated in essential portions of the detection zone 10. The magnetic modulating field $H_{mod}$ preferably has a frequency of about 500–800 Hz, and the electromagnetic excitation and reply signals preferably has a frequency within the GHz band, such as 1.3 GHz or 2.45 GHz.

An object 20, which has been schematically illustrated in FIG. 1 in the form of a box-shaped package, is provided with a sensor according to the invention, comprising at least two magnetic sensor elements, which are arranged in a mutual relationship and represent an identity of the sensor, or of the object 20, to which the sensor is attached. The sensor elements are electromagnetically detectable and comprise a magnetic material, the permeability of which is controllable by a magnetic field and the high-frequency impedance of which depends on said permeability.

According to a preferred embodiment, the material of the sensor elements are essentially identical to the ones described in the abovementioned WO97/29463 and WO97/29464, both of which are fully incorporated herein by reference. In other words, in the preferred embodiment the sensor elements are made from a cobalt-rich amorphous metal alloy, such as $(Fe_{0.06}Co_{0.94})_{72.5}Si_{12.5}B_{15}$. The sensor elements of the preferred embodiment are formed as metal wires with a length of about 5–100 mm and a typical transversal diameter of between 7 and 55 $\mu$m. Furthermore, the wires are provided with a thin coating of glass or another dielectric material, the thickness of which is preferably less than the thickness (diameter) of the metal wire core. Such a wire is commonly referred to as a microwire and is produced by rapidly pulling a molten metal alloy and a surrounding molten glass tube.

According to other embodiments, the material of the sensor elements may be nanocrystalline rather than amorphous. Furthermore, the glass coating may be dispensed with, and the thickness (transversal diameter) may be larger than for the preferred embodiment. Transversal diameters of between 100 and 200 $\mu$m have proven useful, particularly about 125 $\mu$m. However, such wires are not referred to as microwires and are produced in other ways than the one mentioned above, as is well known per se in the technical field of magnetic sensor elements. In summary, the sensor of the present invention may comprise magnetic sensor elements of various kinds, as defined by the appended independent sensor claim.

According to the preferred embodiment the at least two sensor elements are arranged at a certain angle to each other. Preferably, one sensor element is arranged "on top" the other sensor element. The sensor elements may be mounted to a carrier, such as an adhesive label, or alternatively attached directly to the related object, for instance by adhesion. A further alternative is to sew or weave the sensor elements into or onto e.g. an article of clothing or another article of merchandise. In such a case the identity of the sensor may represent an article class or type. Yet another alternative is to integrate the sensor elements into a packaging material, such as cardboard, paper or plastic film, or into an article of recycling (e.g. a plastic container, a glass bottle, a cardboard package, etc.). In such cases, the identity of the sensor may represent e.g. a type of material for each recycling article.

The identity of the sensor (or its related object) is provided by the value of the angular deviation between the sensor elements. When assembling the sensor, the sensor elements are arranged according to one specific predetermined orientation selected from a set of such predetermined orientations.

A second magnetic field generating means 18 is arranged in the detection zone 10 for generating a second magnetic field $H_{bias}$. This second magnetic field is magnitude-invariant and is given a rotating magnetic field vector (i.e. the magnetic field has a field strength, which does not vary with time but which changes in direction).

As previously mentioned, the Giant Magnetoimpedance effect causes a modulation in amplitude of the electromagnetic reply signal transmitted from the sensor and received by the receiver antenna 12. For high frequency signals the Skin Depth of the wire (sensor element) material controls the impedance of the wire. The Skin Depth is controlled by the magnetic permeability of the wire, and the magnetic permeability is in turn controlled by the magnitude of the magnetic field surrounding the sensor in the detection zone 10. The magnetic modulating field $H_{mod}$ generated by the means 16 has a magnitude-variant ("AC") as well as a magnitude-invariant ("DC") component. Basically, the frequency of the amplitude-modulation of the electromagnetic reply signal is determined by the AC component, and the phase of the modulation is determined by positive or negative DC level.

Figure 2:
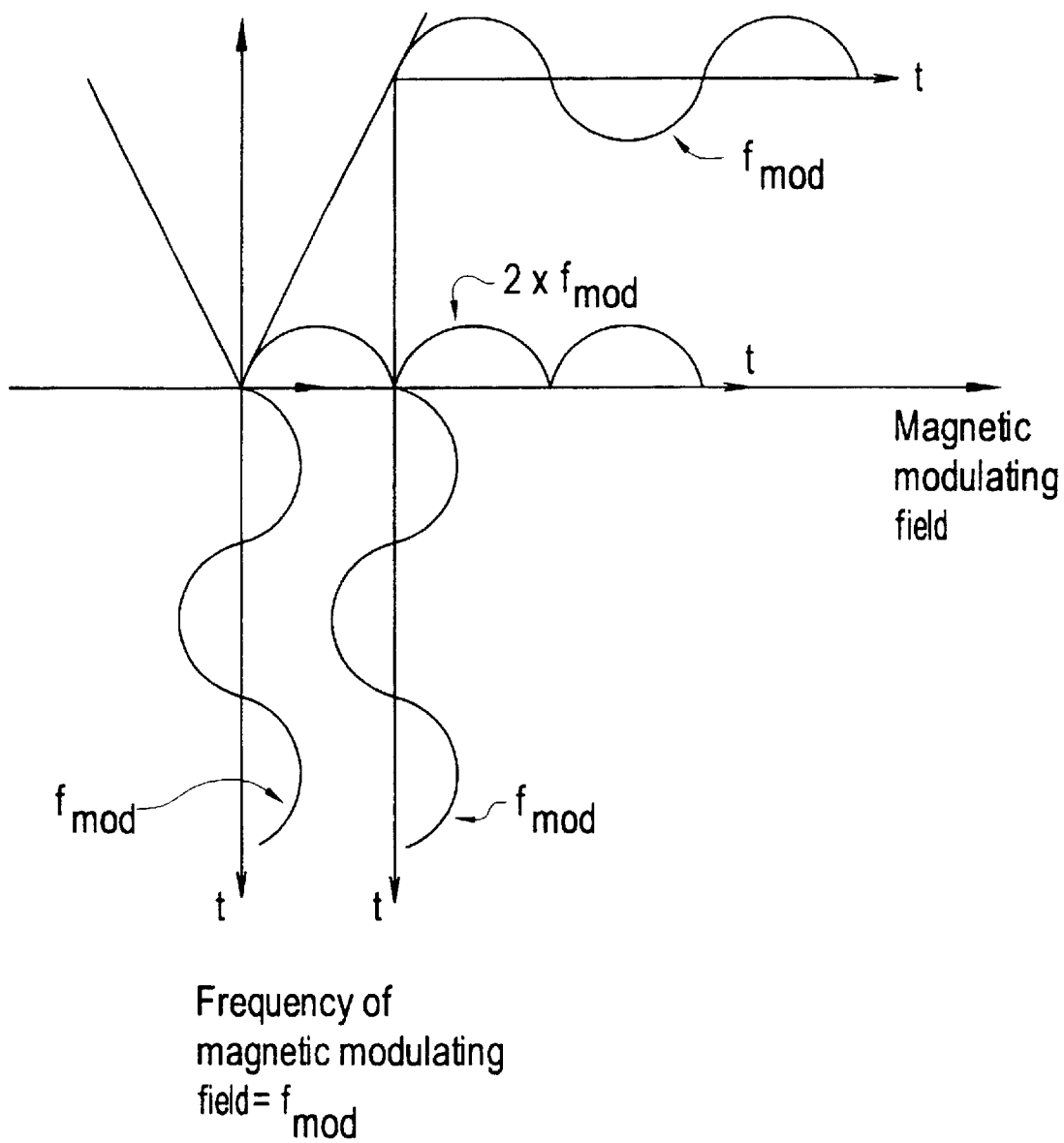
FIG. 2 is a diagram illustrating a frequency shift effect, which is used in the method according to the present invention.

In FIG. 2 the impedance of the sensor element at high frequencies is illustrated as a function of the magnetic modulating field. The rightmost vertical sinewave illustrates the normal situation, where the magnetic modulating field $H_{mod}$ has an AC as well as a DC component. The AC component of $H_{mod}$ has a frequency $f_{mod}$. As illustrated by the uppermost horizontal sinewave, the resulting variations in the impedance of the sensor element have the same frequency $f_{mod}$. The amplitude of the electromagnetic reply signal transmitted from the sensor will follow these variations in impedance, and therefore the reply signal will be modulated in amplitude by the varying magnetic modulating field $H_{mod}$. The demodulated reply signal will thus contain a signal of frequency $f_{mod}$.

However, as illustrated by the leftmost vertical sinewave in FIG. 2, if the magnetic modulating field has no DC component (magnitude-invariant component), a frequency doubling effect will occur in the amplitude modulation of the electromagnetic reply signal from the sensor element, since the magnetoimpedance effect is insensitive to sign (i.e., direction of the magnetic modulating field). The resulting frequency doubling is illustrated by the lower-most horizontal halfwave, which has a frequency of $2 \cdot f_{mod}$. Consequently, the demodulated signal will have a frequency, which is twice as high as the frequency $f_{mod}$ of the magnetic modulating field $H_{mod}$.

The frequency doubling effect described above provides a distinct signal feature, which is used according to the present invention for detecting also the identity of the sensor. Normally, at least a portion of the magnitude-invariant component of the magnetic modulating field in the detection zone 10 originates from the magnetic field of the earth and/or other magnetic material sources present in the detection zone.

Figure 3:
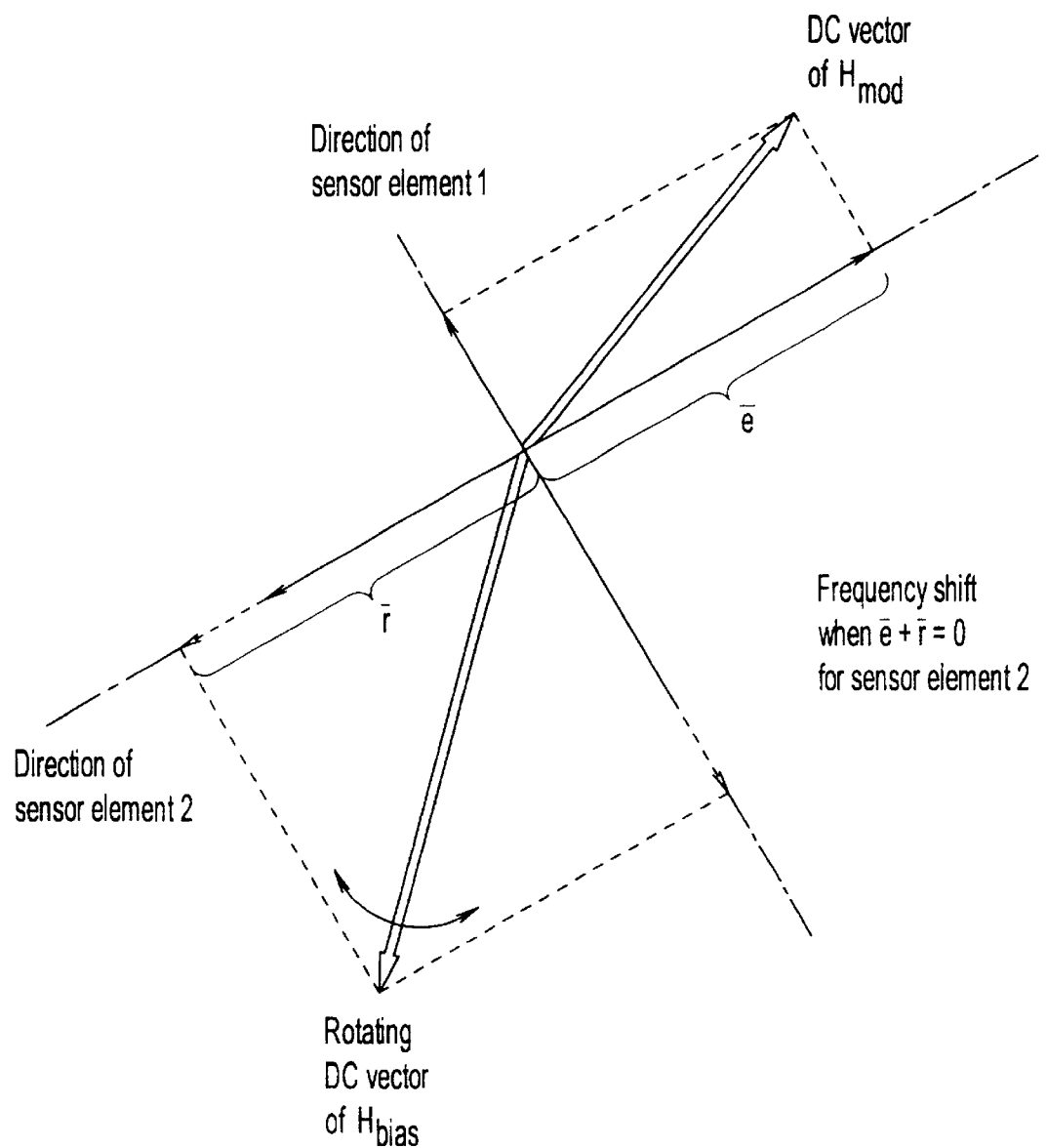
FIGS. 3 and 4 are vector diagrams illustrating the principle of detection according to the present invention.

As illustrated in FIG. 3, by adding the rotating magnetic field vector of the second magnetic field $H_{bias}$, which is generated by the second magnetic field generating means 18, the direction or orientation of each sensor element may be determined. A prerequisite for a successful detection of the sensor element angle is that the magnitude of the rotating field vector of the magnetic field $H_{bias}$ is equal to or greater than the magnitude-invariant component of the magnetic modulating field $H_{mod}$. Initially, in absence of the second magnetic field, each sensor element is exposed to a projection of the DC component of the first magnetic field $H_{mod}$ along a longitudinal direction of the sensor element. As the magnitude-invariant field vector of the second magnetic field $H_{bias}$ is applied and rotated, each sensor element will also be exposed to a corresponding projection of the applied field vector of $H_{bias}$. Through the rotation of this field vector, the projection of the second field vector $H_{bias}$ will sooner or later exactly balance the magnitude-invariant field vector of the first magnetic field $H_{mod}$, thereby causing a frequency shift to $2 \cdot f_{mod}$ (i.e., two times the modulating frequency of $H_{mod}$), as illustrated in FIG. 2. Since the momentary orientation of the second magnetic field vector $H_{bias}$ is known, the orientation of each sensor element may be determined, as will be further described below.

Figure 4:
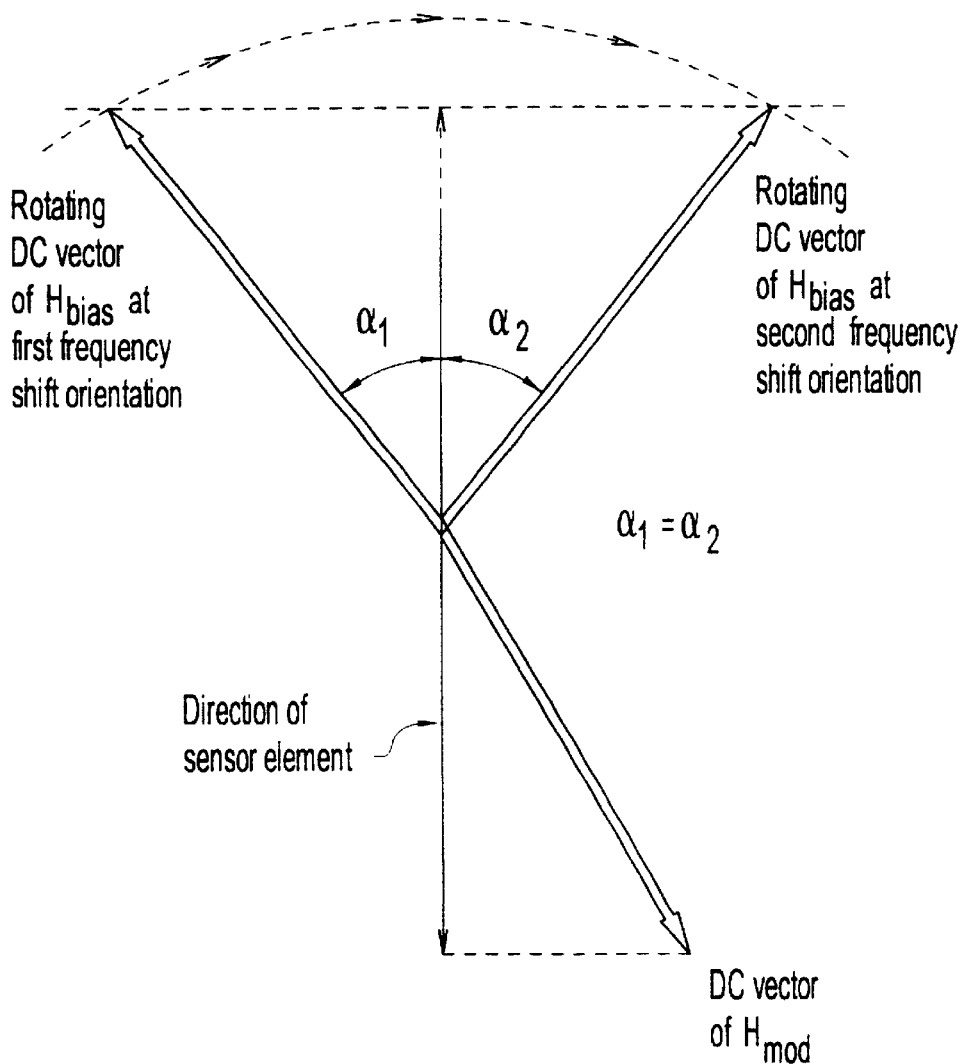

As illustrated in FIG. 4, the resulting zero DC field condition will occur at symmetrical angles for a respective sensor element. If the rotating DC vector of $H_{bias}$, is larger than the DC vector of $H_{mod}$, the resulting magnetic DC field imposed on the sensor element will decrease to zero for a first time at an angle $\alpha_1$ and for a second time at an angle $\alpha_2$, where $\alpha_1 = \alpha_2$. Therefore, even if the orientation or magnitude of the DC vector of the first magnetic field $H_{mod}$ is unknown, the orientation of the sensor element may be calculated by detecting the angles $\alpha_1$ and $\alpha_2$ and then, for reasons of symmetry, determining the orientation as being the center angle between $\alpha_1$ and $\alpha_2$. However, in the event that the DC vector of $H_{mod}$ has exactly the same magnitude as the rotating DC vector of $H_{bias}$, the resulting zero DC field condition will occur only once, i.e. when the DC vector of $H_{bias}$ is parallel to the sensor element, wherein the orientation of the sensor element is immediately obtained.

It is possible, within the scope of the invention, to perform the identification in several steps, wherein the magnitude of $H_{bias}$, is changed between each full rotation of the field. In this way the identification of both sensor elements is facilitated.

The present invention has been described above by way of a few exemplary embodiments. However, other embodiments than the ones described above are possible within the scope of the invention, as defined by the appended independent patent claims.

What is claimed is:

1. A method for remote detection of objects, each object being provided with a sensor comprising at least two magnetic elements arranged in a predetermined mutual relationship representing an identity of the sensor, wherein electromagnetic signals are generated for exciting the sensor elements to produce electromagnetic reply signals, an amplitude of the electromagnetic reply signal from each sensor element being modulated by a first magnetic field ($H_{mod}$) having a magnitude-variant (AC) and a magnitude-invariant (DC) component, comprising the steps of generating a second magnetic field ($H_{bias}$) with rotating field vector; detecting a frequency shift in a component of said reply signal occurring when a magnitude-invariant component of said second magnetic field balances the magnitude-invariant component of said first magnetic field ($H_{mod}$), wherein the respective sensor element is momentarily exposed to a resulting magnetic field with essentially no magnitude-invariant component; and determining an orientation of the respective sensor element from the orientation of the magnitude-invariant component of said second magnetic field, when said frequency shift occurs.

2. A method according to claim 1, further comprising the steps of demodulating said electromagnetic reply signal and detecting said frequency shift in the demodulated reply signal.

3. A method according to claim 1 or 2, wherein said frequency shift is a shift from a nominal frequency of said component of the electromagnetic reply signal to a twice as high frequency.

4. A method according to claim 3, wherein articles of merchandise are provided with a respective sensor and the identity of each sensor represents an article class or type.

5. A method according to claim 3, wherein recycling articles, such as plastic containers, glass bottles, cardboard packages, etc, are provided with a respective sensor and the identity of each sensor represents a type of material for each recycling article.

6. A sensor for remote detection of objects, comprising a first magnetic sensor element adapted to transmit a modulated electromagnetic reply signal in response to receiving an electromagnetic input signal under exposure of a magnetic field ($H_{mod}$), comprising the steps of
 a second magnetic sensor element adapted to transmit a modulated electromagnetic reply signal in response to receiving an electromagnetic input signal under exposure of said magnetic field ($H_{mod}$),
 wherein said first and second magnetic sensor elements are arranged in a mutual relationship selected from a set of predetermined relationships and representing an identity of the sensor, or of an object to which the sensor is attached, and
 wherein a magnetic material of each sensor elements is adapted to exhibit a frequency shift in its electromagnetic reply signal when being momentarily exposed to a magnetic field with essentially no magnitude-invariant component.

7. A sensor according to claim 6, wherein a magnetic material of each sensor elements is an amorphous or nanocrystalline metal alloy.

8. A sensor according to claim 6 or 7, wherein each sensor element is formed as a wire.

9. A sensor according to claim 8, wherein the diameter of each sensor element is 100–200 $\mu$m.

10. A sensor according to claim 8, wherein the diameter of each sensor element is 7–55 $\mu$m.

11. A sensor according to claim 10, wherein each sensor element is provided with a coating of dielectric material, such as glass.

12. A sensor according to claim 6 or 7, wherein the magnetic material exhibits a Giant Magnetoimpedance-effect when exposed to electromagnetic energy of high frequency and magnetic energy of lower frequency.

13. A sensor according to claim 6 or 7, wherein the magnetic material has a majority ratio of cobalt.

14. A sensor according to claim 13, wherein the composition of the magnetic material is $(Fe_{0.06}Co_{0.94})_{72.5}Si_{12.5}B_{15}$.

15. A system for remote detection of objects, each object being provided with a sensor comprising a magnetic sensor element, the system comprising transmitter means for transmitting electromagnetic signals in a detection zone; receiver means for receiving electromagnetic reply signals generated by the sensor in response to the electromagnetic signals from the transmitter means; and means for generating a first magnetic field ($H_{mod}$) for modulating the electromagnetic reply signal from the sensor, comprising the steps of
 means for generating a second magnetic field ($H_{bias}$) with rotating orientation in the detection zone,
 means for detecting a frequency shift in a component of the electromagnetic reply signal, caused by said second magnetic field ($H_{bias}$), and
 means for calculating an orientation of said magnetic sensor element from a momentary orientation of said second magnetic field ($H_{bias}$).

16. A system according to claim 15, further comprising means for demodulating said electromagnetic reply signal prior to the detection of said frequency shift.

* * * * *